(No Model.)
B. McKILLEN.
BOLT HEADER.
No. 290,085. Patented Dec. 11, 1883.
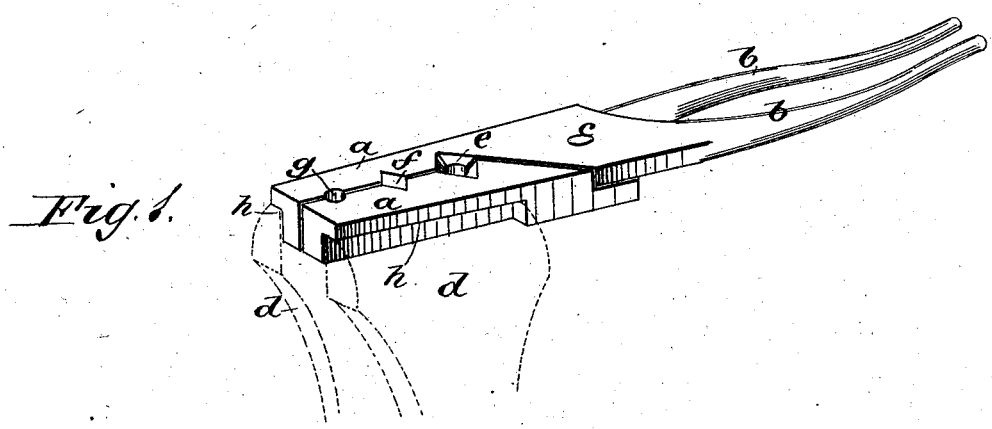
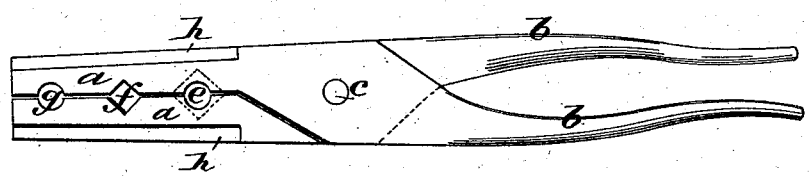
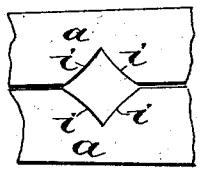
WITNESSES:
Francis McArdle.
C. Sedgwick
INVENTOR:
B. McKillen
BY Munn & Co.
ATTORNEYS.

UNITED STATES PATENT OFFICE.

BENJAMIN McKILLEN, OF VERONA MILLS, MICHIGAN.

BOLT-HEADER.

SPECIFICATION forming part of Letters Patent No. 290,085, dated December 11, 1883.

Application filed April 30, 1883. (No model.)

*To all whom it may concern:*

Be it known that I, BENJAMIN McKILLEN, of Verona Mills, in the county of Huron and State of Michigan, have invented a new and Improved Bolt-Header, of which the following is a full, clear, and exact description.

My invention consists of die-grooves formed in the jaws of a tongs-shaped tool, consisting of two handled jaws pivoted together, the said jaws having a rabbet along the outer edge of the under side, to set within and rest upon the jaws of a vise, so that the power of the vise may be used to cause the jaws to grip the rod or bar on which the head is to be formed with sufficient power to hold the rod by such grip alone while the head is being formed, thus dispensing with the use of any gage-block or other device for the end of the rod to bear against, and enabling the heads to be formed on rods or bars of any length, and making a useful tool to hold rods or bolts for cutting screw-threads on them with the hand die-stock, and for other purposes, all as hereinafter fully described.

Reference is to be had to the accompanying drawings, forming part of this specification, in which similar letters of reference indicate corresponding parts in all the figures.

Figure 1 is a perspective view of my improved bolt-header. Fig. 2 is a plan view of it inverted, and Fig. 3 is a detail in plan view.

I make die-jaws $a$ with handles $b$, and pivot them together at $c$, in the manner of tongs and pliers, preferring to make the jaws about as long as the breadth of the jaws $d$ of an ordinary blacksmith's vise, and forming as many die grooves or notches $e\ f\ g$, of different forms and sizes, as the length will allow, and I rabbet the outer edges or corners of the under side, as shown at $h$, so that the jaws will drop between and rest on the top of the jaws $d$ of a vise, as shown in Fig. 1, both for clamping the bolt in the dies, to hold it by their grip against the sides, and to serve for an anvil on which to hammer down the head.

It will be seen that by using rods or bars a little larger than the notches or grooves of the jaws said jaws will grip the hot iron, when forced against it by the jaws of the vise, and squeeze it down to the size of the jaws to hold the rods without end support; also, to make uniform sizes, which is important in making bolts with square shanks, and also to make well-defined angles of the square shoulders. The tool will also serve as a holder for rods of different kinds of work for setting and truing the parts.

Besides the facility such a tool affords of making well-defined angles to the square shanks, I propose to make the sides $i$ of the shoulder-socket a little convex, so that the sides of the shoulder will be slightly concave.

Having thus fully described my invention, what I claim as new, and desire to secure by Letters Patent, is—

A bolt-heading tool consisting of handled and pivoted die-jaws $a$, having rabbet-grooves $h$ in the lower side to be secured between and on the jaws of a vise, substantially as described.

BENJAMIN McKILLEN.

Witnesses:
M. S. KNEALE,
D. H. LUDINGTON.